United States Patent [19]

Harada et al.

[11] Patent Number: 5,229,079

[45] Date of Patent: * Jul. 20, 1993

[54] CATALYTIC CONVERTER FOR USE IN AUTOMOTIVE EXHAUST EMISSION CONTROL

[75] Inventors: Takashi Harada, Nagoya; Fumio Abe, Handa; Hiroshige Mizuno, Tajimi, all of Japan

[73] Assignee: NGK Insulators, Ltd., Japan

[*] Notice: The portion of the term of this patent subsequent to Nov. 5, 2008 has been disclaimed.

[21] Appl. No.: 852,508

[22] Filed: Mar. 17, 1992

Related U.S. Application Data

[63] Continuation of Ser. No. 581,989, Sep. 14, 1990, abandoned.

[30] Foreign Application Priority Data

Jun. 29, 1990 [JP] Japan .................. 2-172930

[51] Int. Cl.$^5$ .................. F01N 3/10; B01D 53/36; H05B 3/10
[52] U.S. Cl. .................. 422/174; 422/177; 422/179; 422/180; 55/523; 55/DIG. 30; 60/300
[58] Field of Search .............. 422/174, 177, 179, 180; 55/523, DIG. 30; 60/300

[56] References Cited

U.S. PATENT DOCUMENTS

| | | | |
|---|---|---|---|
| 3,755,204 | 8/1973 | Sergeys | 422/180 X |
| 3,768,982 | 10/1973 | Kitzner et al. | |
| 3,770,389 | 10/1973 | Kitzner et al. | |
| 3,925,252 | 12/1975 | Yabuta et al. | 422/177 X |
| 3,956,614 | 5/1976 | Hervert | |
| 4,023,360 | 5/1977 | Wössner et al. | 422/171 X |
| 4,322,387 | 3/1982 | Virk et al. | 422/174 |
| 4,345,430 | 8/1982 | Pallo et al. | 60/282 |
| 4,420,316 | 12/1983 | Frost et al. | 422/180 X |
| 4,505,107 | 3/1985 | Yamaguchi et al. | |
| 4,758,272 | 7/1988 | Pierotti et al. | |
| 5,011,529 | 4/1991 | Hogue et al. | |

FOREIGN PATENT DOCUMENTS

| | | |
|---|---|---|
| 0194507 | 2/1986 | European Pat. Off. |
| 0355489 | 2/1990 | European Pat. Off. |
| 1188373 | 3/1965 | Fed. Rep. of Germany . |
| 2333092 | 1/1975 | Fed. Rep. of Germany ........ 60/300 |
| 61-161599 | 10/1986 | Japan . |
| 63-67609 | 3/1988 | Japan . |
| 1492929 | 6/1974 | United Kingdom . |
| 2049377A | 12/1980 | United Kingdom . |
| WO89/10471 | 11/1989 | World Int. Prop. O. . |

OTHER PUBLICATIONS

SwRI-9574, "Experimentation to Determine the Feasibility of Air Injection on an Electrically-Heated Catalyst for Reducing Cold-Start Benzene Emissions from Gasoline Vehicles" by Martin J. Heimrich, Jan., 1990.

*Primary Examiner*—Robert J. Warden
*Assistant Examiner*—Stephanie Blythe
*Attorney, Agent, or Firm*—Parkhurst, Wendel & Rossi

[57] ABSTRACT

A catalytic converter suitable for use in controlling automotive exhaust emissions including a honeycomb heater disposed downstream of a main monolithic catalyst or between main monolithic catalysts. The honeycomb heater includes a honeycomb structure with a catalyst carried thereon and with at least two electrodes provided thereon to supply a current thereto. A catalytic converter also includes a monolith catalyst for ignition which is disposed downstream of the honeycomb heater. A catalytic converter includes, in place of the honeycomb heater and the monolithic catalyst, a module which is composed of a catalyzed light-off honeycomb heater or of a honeycomb heater and a light-off monolithic catalyst. The module is removably disposed upstream or downstream of a main monolithic catalyst, or between main monolithic catalysts.

20 Claims, 2 Drawing Sheets

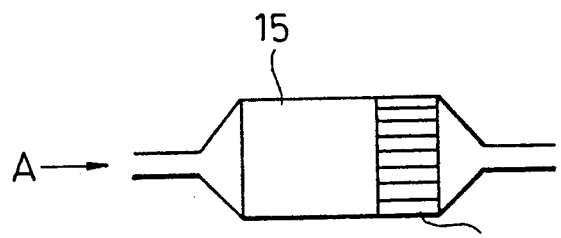
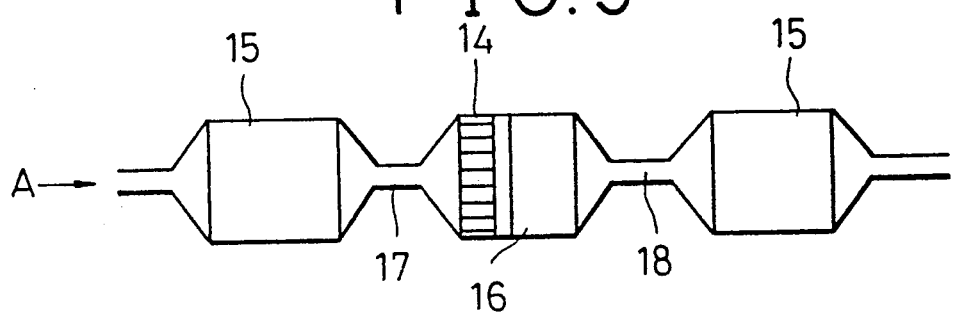
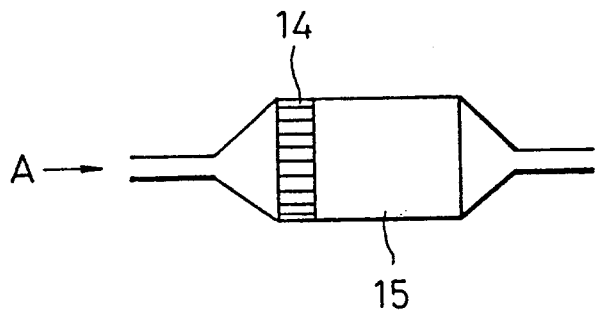

CATALYTIC CONVERTER FOR USE IN AUTOMOTIVE EXHAUST EMISSION CONTROL

This is a continuation of application Ser. No. 07/581,989 filed Sept. 14, 1990, now abandoned.

BACKGROUND OF THE INVENTION

1. Field of the Invention

The present invention relates to a catalytic converter suitable for use in automotive exhaust emission control.

2. Description of the Related Art

Catalytic converters for use in automotive exhaust gas control must have a predetermined temperature or above when operated so as to cause catalytic action. Hence, the catalyst must be heated when the temperature thereof is not sufficiently high, i.e., at the beginning of running of a vehicle.

Such techniques for heating the catalyst have been proposed in, for example, Japanese Utility Model Laid-Open No. 67609/1988. This disclosed technique is a catalytic converter comprised of a metal monolithic catalyst disposed upstream of and adjacent to a main ceramic monolithic catalyst. The metal monolithic catalyst comprises an electrically conductible metal substrate with alumina coated thereon.

However, deterioration of the catalyst such as a monolithic catalyst starts with that located upstream. In the catalytic converter disclosed in Japanese Utility Model Laid-Open No. 67609/1988, the catalytic component in the metal monolithic catalyst, which is a preheater disposed upstream of adjacent to the main monolithic catalyst, therefore deteriorates first, thereby reducing its exhaust gas conversion efficiency when the temperature of the exhaust gas is low. Furthermore, there is a possibility of the metal substrate being corroded.

SUMMARY OF THE INVENTION

An object of the present invention is to provide a catalytic converter which is capable of eliminating the aforementioned problem of the conventional techniques by disposing a heater downstream of a main monolithic catalyst.

To this end, the present invention provides a catalytic converter suitable for use in controlling automotive exhaust emissions. The catalytic converter includes a honeycomb heater which is disposed downstream of a main monolithic catalyst or between main monolithic catalysts. The honeycomb heater comprises a honeycomb structure with a catalyst supported thereon and with at least two electrodes provided thereon to supply a current to the honeycomb structure.

The present invention further provides a catalytic converter suitable for use in controlling automotive exhaust emissions. This catalytic converter includes a honeycomb heater disposed downstream of a main monolithic catalyst or between main monolithic catalysts, and a light-off monolithic catalyst which is disposed downstream of the honeycomb heater. The honeycomb heater comprises a honeycomb structure with at least two electrodes provided thereon to supply a current thereto.

A honeycomb heater having a resistance adjusting mechanism, such as a slit or slits, between the electrodes exhibits excellent heating characteristics and is therefore preferred. Preferably, a honeycomb structure employed in the present invention is manufactured by forming metal powders into a honeycomb configuration and then sintering a formed honeycomb body.

The present invention further provides a catalytic converter suitable for use in controlling automotive exhaust emissions. This catalytic converter includes a module which is removably disposed upstream or downstream of a main monolithic catalyst, or between the main monolithic catalysts. The module is composed of a catalyzed light-off honeycomb heater or of a honeycomb heater and a light-off monolith catalyst. The honeycomb heater comprises a honeycomb structure with at least two electrodes provided thereon to supply a current thereto.

BRIEF DESCRIPTION OF THE DRAWINGS

FIGS. 2 to 5 show examples of the catalytic converters suitable for use in controlling automotive exhaust emissions which are manufactured in the present invention; and FIG. 6 is a comparative example of a conventional catalytic converter.

DETAILED DESCRIPTION OF THE INVENTION

Figure 1:
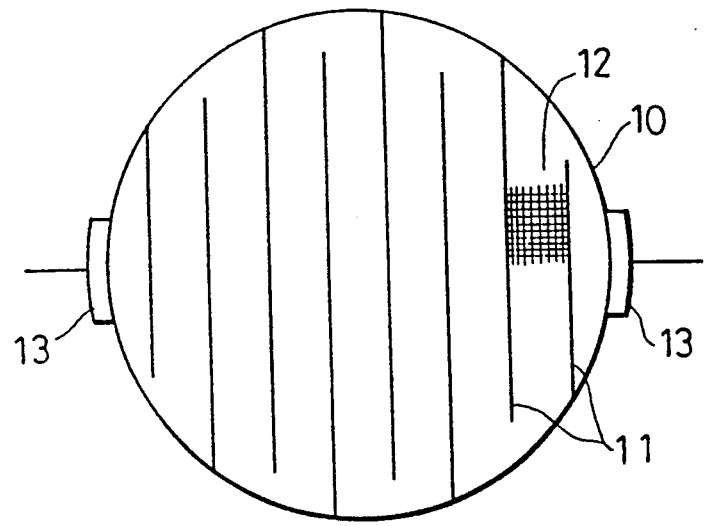
FIG. 1 is a plan view of an example of a honeycomb heater with a catalyst carried thereon.

In the catalytic converter of the present invention, a main monolithic catalyst is disposed at least upstream of an exhaust gas flow passage, and a honeycomb heater is disposed downstream of the main monolithic catalyst. The honeycomb heater comprises a honeycomb structure with at least two electrodes provided thereon to supply a current to the honeycomb structure.

In the catalytic converter, an exhaust gas can be heated by the honeycomb heater disposed downstream of the main monolithic catalyst when the temperature of the exhaust gas is low, e.g., at the beginning of running of a vehicle. Furthermore, metal corrosion of the honeycomb heater or deterioration of the catalyst carried on the honeycomb heater, caused by the exhaust gas having a high temperature, can be suppressed to a minimum due to the main monolithic catalyst disposed upstream of the exhaust gas flow passage.

In the case of a catalytic converter in which a module composed of a catalyzed light-off honeycomb heater or of a honeycomb heater and a light-off monolith catalyst is removably disposed upstream or downstream of the main monolithic catalyst, or between the main monolithic catalysts, the honeycomb heater or the light-off catalyst (catalyst for ignition) deteriorates prior to the main monolithic catalyst. The deteriorated module can be replaced with a new one, by which the life of the catalytic converter can be prolonged.

Whereas any material, ceramic or metal, capable of generating heat when energized, can be used as the material of the honeycomb structure which is a basic body of the present invention, the use of metal enhances the mechanical strength and is thus preferred. Examples of such metals include stainless steel and materials having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion. The honeycomb structure employed in the present invention may be porous or non-porous. In the case where a catalyst is carried on the honeycomb structure, however, a porous honeycomb structure is preferred because a catalyst layer can be closely adhered to such a honeycomb structure, and hardly peels off the honeycomb structure even when a difference in the thermal expansion between the honeycomb structure and the catalyst exists.

The metal honeycomb structure will be prepared in the manner described below.

First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion.

Next, the formed honeycomb body is fired in a non-oxidizing atmosphere at a temperature ranging between 1000° and 1450° C. During the sintering in the non-oxidizing atmosphere containing hydrogen, the organic binder is decomposed and thereby removed with the aid of Fe or the like, which acts as a catalyst. A good sintered body (a honeycomb structure) can therefore be obtained.

Sintering at a temperature lower than 1000° C. achieves no sintering. Sintering at a temperature higher than 1450° C. causes deformation of the resultant sintered body and is thus undesirable.

Preferably, a heat-resistant metal oxide layer is then formed on the surface of the cell walls and the surface of the pores of the obtained honeycomb structure.

Next, a resistance adjusting mechanism of a desired form is preferably provided on the obtained honeycomb structure between the electrodes thereof, which will be described later.

the resistance adjusting mechanism provided on the honeycomb structure may take on any of the following forms:

(1) a slit or slits of any length, formed in any direction at any position;

(2) variations in the length of the cell walls in the axial direction of the passages;

(3) variations in the thickness (wall thickness) of the cell walls of the honeycomb structure or variations in the cell density of the honeycomb structure; or (4) a slit or slits formed in the cell wall (rib) of the honeycomb structure.

Electrodes are provided generally on the outer peripheral portion of or inside of the thus-obtained metal honeycomb structure by welding or brazing to manufacture a honeycomb heater.

The term "electrodes" is used in this application to refer to any terminal through which a voltage is applied to the heater. The electrodes include direct bonding of the outer peripheral portion of the heater to a can body and terminals for grounding.

In the case of the metal honeycomb structure which is used as a heater, the resistance thereof will be preferably held between 0.001 Ω and 0.5 Ω.

A catalyst is placed on the surface of the metal honeycomb structure so as to allow heat to be generated due to reaction (oxidation) of the exhaust gas, and is preferred.

The catalyst supported on the surface of the metal honeycomb structure is made of a carrier having a high surface area and a catalyst activating material supported on the carrier. Typical examples of the carriers having a high surface area include $\gamma$-$Al_2O_3$, $TiO_2$, $SiO_2$-$Al_2O_3$ and perovskite. Examples of the catalytic activating material include noble metals, such as Pt, Pd and Rh, and base metals, such as Cu, Ni, Cr and Co. The preferred catalyst is one in which from 10 to 100 g/ft$^3$ of Pt and/or Pd is loaded on the carrier made of $\gamma$-$Al_2O_3$.

The light-off catalyst disposed at the rear of (downstream of) the honeycomb heater may be the same as the catalyst carried on the surface of the metal honeycomb structure or the same as the main monolithic catalyst.

Whereas the honeycomb structure employed in the present invention may have any honeycomb configuration, it is desirable that the cell density ranges from 6 to 1500 cells/in$^2$ (0.9 to 233 cells/cm$^2$) with a wall thickness ranging from 50 to 2000 $\mu$m.

As stated above, the honeycomb structure employed in the present invention may be porous or non-porous. To achieve sufficient mechanical strength and resistance to oxidation and corrosion, however, the porosity of the metal honeycomb structure will preferably be held between 0 and 50% by volume with most preferable porosity being less than 25% by volume. In a metal honeycomb structure designed for use as a substrate for a catalyst, the porosity will be held to 5% or above to ensure strong adhesion between the honeycomb structure and a catalyst layer.

The term, "honeycomb structure" is employed in this application to refer to an integral body having a large number of passages partitioned by the walls. The passages may have any cross-sectional form (cell shape), e.g., a circular, polygonal or corrugated form.

The present invention will further be illustrated in the following illustrative, but not limiting examples.

FIG. 1 is a plan view of an example of a honeycomb heater with a catalyst carried thereon according to the present invention. A plurality of slits 11, which act as the resistance adjusting mechanism, are provided in a honeycomb structure 10 having a large number of passages 12. Two electrodes 13 are provided on the outer wall of the honeycomb structure 10.

FIGS. 2 to 5 show examples of a catalytic converter for use in controlling automotive exhaust emissions according to the present invention.

Figure 2:
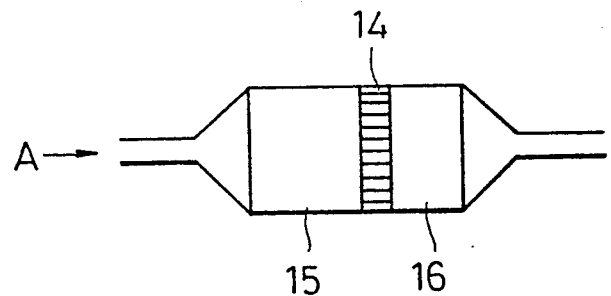
Figure 3:
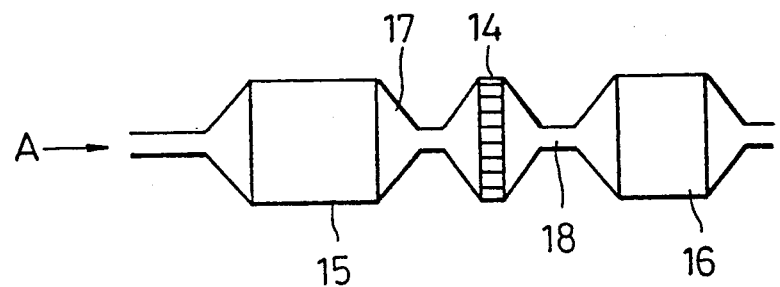

FIG. 2 shows an example of a catalytic converter in which a honeycomb heater or a heater catalyst (catalyzed honeycomb heater) 14 is inserted between a main monolithic catalyst 15 and a light-off catalyst 16. FIG. 3 shows an example of a catalytic converter in which a honeycomb heater or a heater catalyst 14 is disposed downstream of a main monolithic catalyst 15 and upstream of a light-off catalyst 16 with flow passages 17 and 18 respectively therebetween.

FIG. 4 shows an example of a catalytic converter in which a heater catalyst 14, which also acts as an light-off catalyst, is disposed downstream of and adjacent to a main monolithic catalyst 15. FIG. 5 shows an example of a catalytic converter in which a honeycomb heater or a heater catalyst 14 and a light-off catalyst 16 are disposed between two main monolithic catalysts 15 with flow passages 17 and 18 respectively therebetween. The light-off catalyst 16 is disposed downstream of and adjacent to the honeycomb heater or the heater catalyst 14. In FIG. 5, a module composed of the honeycomb heater 14 and the light-off catalyst 16 may be preferably used.

EXAMPLE

Fe powder, Fe-Cr powder and Fe-Al powder were mixed to prepare a mixture having a composition of Fe-20Cr-5Al (% by weight), and the obtained mixture was then formed by extrusion into a honeycomb body.

The formed honeycomb body was then sintered at an atmosphere of $H_2$ to obtain a honeycomb structure having an outer diameter of 93 mm$\phi$, a thickness of 15 mm, a cell wall (rib) thickness of 8 mil and a passage density of 300 cells/in$^2$. Thereafter, eight slits 11, six of which had a length of about 70 mm while two of them located at the two sides had a length of about 50 mm, were formed in the obtained honeycomb structure 10 in the axial direction of the passages 12 thereof in such a manner they were separated from each other by a distance corresponding to seven cells (about 10 mm), i.e., seven cells were disposed between the adjacent slits 11, as shown in FIG. 1.

A layer of $\gamma$-alumina was coated on the honeycomb structure 10. Thereafter, 20 g/ft$^3$ of Pd and Pt were respectively loaded on the coated layer. The whole structure was then sintered at 600° C. to generate a catalyst. Subsequently, two electrodes 13 were provided on the outer wall of the obtained honeycomb structure 10 to make it a heater catalyst 14, as shown in FIG. 1.

The obtained heater catalyst 14 was disposed at the rear of (downstream of) a three-way catalyst 15 available on the market (i.e., a main monolithic catalyst). A and an light-off catalyst 16 which was an oxidation catalyst was provided at the rear of the heater catalyst. 14, as shown in FIG. 2.

The performance of this system at the beginning of the operation of an engine was tested by introducing into this system an exhaust gas A whose temperature was raised at a constant rate from 100° C. to 420° C. for two minutes and was then maintained at 420° C. for one minute (warming-up test) and by measuring the conversion for CO, HC and NOx. Table 1 shows the results of the measurements. At the beginning of the test, the heater catalyst 14 was energized for one minute by a battery of 12 V in order to heat the exhaust gas to 350° C.

Next, the durability test was conducted on the above system in the manner described below: the temperature of an exhaust gas was raised from room temperatures to 750° C., and then maintained at 750° C. for ten hours. While the temperature was maintained at 750° C., a cyclic operation was repeated in which the engine was cruised for 60 seconds and then introduction of the fuel was cut for 5 seconds. At the beginning of the durability test, the heater catalyst 14 was energized for one minute in the same manner as that in which it was energized in the above measurements in order to heat the exhaust to 350° C.

After this durability test was performed ten times, the warming-up test was conducted and the conversion for CO, HC and NOx was measured.

For comparison, the durability test was conducted on a system in which the heater catalyst 14 was disposed in front of the main monolithic catalyst 15, as shown in FIG. 6.

Table 1 shows the average conversion obtained by the system according to the present invention before and after the durability test and that obtained by the comparative example after the durability test.

TABLE 1

| Average conversion (%) (warming-up test) | | | |
| --- | --- | --- | --- |
| | CO | HC | NOx |
| Before the durability test | 68 | 53 | 66 |
| After the durability test (The present invention) | 60 | 46 | 61 |
| After the durability test (Comparative example) | 46 | 41 | 47 |

As will be understood from the foregoing description, in the catalytic converter according to the present invention, the honeycomb heater is provided downstream of the main monolithic catalyst. In consequence, an exhaust gas whose temperature is low can be heated by the honeycomb heater at the beginning of operation of the engine. Furthermore, corrosion of the honeycomb heater or deterioration of the catalyst carried on the honeycomb heater, caused by the high-temperature exhaust gas, can be suppressed to a minimum due to the main monolithic catalyst provided upstream of the honeycomb heater.

In the case of the catalytic converter of the present invention which employs a module composed of a catalyzed light-off honeycomb heater or of the honeycomb heater and the light-off monolith catalyst, a deteriorated module can be replaced with a new one. This enables the life of the catalytic converter to be prolonged.

What is claimed is:

1. A catalytic converter for a fluid to be flowed therethrough, comprising:
   (i) at least one main monolithic catalyst capable of being disposed in a fluid stream; and
   (ii) a heating element capable of being disposed in said fluid stream in a location selected from the group consisting of downstream of said at least one main monolithic catalyst and between a plurality of main monolithic catalysts, said heating element comprising:
   an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
   at least two electrodes in electrical contact with said honeycomb structure.

2. The catalytic converter of claim 1, wherein said at least one slit pierces the radial periphery of said honeycomb structure.

3. The catalytic converter of claim 1, wherein said electrodes are in electrical contact with the radial periphery of said honeycomb structure.

4. The catalytic converter of claim 3, wherein said electrodes are located in opposition to each other across a volume of said honeycomb structure, in a direction which is generally transverse to said axial direction.

5. The catalytic converter of claim 1, wherein said at least one slit is defined by a plurality of slits which are parallel to each other.

6. The catalytic converter of claim 1, wherein said heating element further comprises a catalyst material formed on said partition walls.

7. The catalytic converter of claim 1, further comprising an additional monolithic catalyst disposed downstream of said heating element.

8. A catalytic converter for a fluid to be flowed therethrough, comprising:
  (i) at least one main monolithic catalyst capable of being disposed in a fluid stream; and
  (ii) a removable module capable of being disposed in said fluid stream and being adjacent to said at least one main monolithic catalyst, said module including a heating element which comprises:
    an electrically conductive monolithic honeycomb structure having a radial periphery and two ends, including a plurality of passages which are defined by partition walls and extend in an axial direction between the ends, a catalyst material formed on said partition walls, and at least one slit formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
    at least two electrodes in electrical contact with said honeycomb structure wherein said slit is disposed between said electrodes such that said slit interrupts current flow through portions of said honeycomb structure between said electrodes for heating said honeycomb structure and fluid flowing through said.

9. The catalytic converter of claim 8, wherein said module is disposed in a location selected from the group consisting of upstream of said at least one main monolithic catalyst, downstream of said at least one main monolithic catalyst and between a plurality of main monolithic catalysts.

10. The catalytic converter of claim 8, wherein said at least one slit pierces the radial periphery of said honeycomb structure.

11. The catalytic converter of claim 8, wherein said electrodes are in electrical contact with the radial periphery of said honeycomb structure.

12. The catalytic converter of claim 11, wherein said electrodes are located in opposition to each other across a volume of said honeycomb structure, in a direction which is generally transverse to said axial direction.

13. The catalytic converter of claim 8, wherein said at least one slit is defined by a plurality of slits which are parallel to each other.

14. A catalytic converter for a fluid to be flowed therethrough, comprising:
  at least one main monolithic catalyst capable of being disposed in a fluid stream; and
  a removable module capable of being disposed in said fluid stream and being adjacent to said at least one main monolithic catalyst, comprising:
    (i) a heating element comprising:
      an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
      at least two electrodes in electrical contact with said honeycomb structure; and
    (ii) an oxidation, light-off monolithic catalyst disposed adjacent to said heating element.

15. The catalytic converter of claim 14, wherein said module is disposed in a location selected from the group consisting of upstream of said at least one main monolithic catalyst, downstream of said at least one main monolithic catalyst and between a plurality of main monolithic catalysts.

16. The catalytic converter of claim 14, wherein said heating element further comprises a catalyst material formed on said partition walls.

17. The catalytic converter of claim 14, wherein said at least one slit pierces the radial periphery of said honeycomb structure.

18. The catalytic converter of claim 14, wherein said electrodes are in electrical contact with the radial periphery of said honeycomb structure.

19. The catalytic converter of claim 12, wherein said electrodes are located in opposition to each other across a volume of said honeycomb structure, in a direction which is generally transverse to said axial direction.

20. The catalytic converter of claim 14, wherein said at least one slit is defined by a plurality of slits which are parallel to each other.

* * * * *